United States Patent
Liu et al.

(10) Patent No.: US 11,429,902 B2
(45) Date of Patent: Aug. 30, 2022

(54) METHOD, DEVICE AND COMPUTER PROGRAM PRODUCT FOR DEPLOYING A MACHINE LEARNING MODEL

(71) Applicant: EMC IP Holding Company LLC, Hopkinton, MA (US)

(72) Inventors: Jinpeng Liu, Shanghai (CN); Pengfei Wu, Shanghai (CN); Junping Zhao, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 594 days.

(21) Appl. No.: 16/417,147

(22) Filed: May 20, 2019

(65) Prior Publication Data

US 2020/0250585 A1    Aug. 6, 2020

(30) Foreign Application Priority Data

Jan. 31, 2019  (CN) .......................... 201910101255.X

(51) Int. Cl.
*G06N 20/10* (2019.01)
*G06F 8/41* (2018.01)
*G06F 8/60* (2018.01)
*G06N 20/00* (2019.01)

(52) U.S. Cl.
CPC ............. *G06N 20/10* (2019.01); *G06F 8/447* (2013.01); *G06F 8/60* (2013.01); *G06N 20/00* (2019.01); *G06F 8/41* (2013.01)

(58) Field of Classification Search
CPC ........ G06N 20/00; G06N 20/10; G06N 20/20; G06F 8/41; G06F 8/447; G06F 8/60
See application file for complete search history.

(56) References Cited

U.S. PATENT DOCUMENTS

| | | | |
|---|---|---|---|
| 2020/0012500 A1* | 1/2020 | Kern | G06F 8/60 |
| 2020/0218982 A1* | 7/2020 | Annau | G06N 3/084 |
| 2021/0133620 A1* | 5/2021 | Frank | G06K 9/6296 |

* cited by examiner

*Primary Examiner* — Shane D Woolwine
(74) *Attorney, Agent, or Firm* — Ryan, Mason & Lewis, LLP

(57) ABSTRACT

Embodiments of the present disclosure relate to a method, device and computer program product for deploying a machine learning model. The method comprises: receiving an intermediate representation indicating processing of a machine learning model, learning parameters of the machine learning model, and a computing resource requirement for executing the machine learning model, the intermediate representation, the learning parameters, and the computing resource requirement being determined based on an original code of the machine learning model, the intermediate representation being irrelevant to a programming language of the original code; determining, at least based on the computing resource requirement, a computing node and a parameter storage node for executing the machine learning model; storing the learning parameters in the parameter storage node; and sending the intermediate representation to the computing node for executing the machine learning model with the stored learning parameters.

20 Claims, 4 Drawing Sheets

006# METHOD, DEVICE AND COMPUTER PROGRAM PRODUCT FOR DEPLOYING A MACHINE LEARNING MODEL

RELATED APPLICATION(S)

The present application claims priority to Chinese Patent Application No. 201910101255.X, filed Jan. 31, 2019, and entitled "Method, Device and Computer Program Product for Deploying a Machine Learning Model," which is incorporated by reference herein in its entirety.

FIELD

Embodiments of the present disclosure relate to the field of artificial intelligence, and more specifically to a method, a device and a computer program product for deploying a machine learning model.

BACKGROUND

In recent years, along with the advancement of artificial intelligence technology, machine learning or deep learning (DL) has promoted the development of many fields. At the same time, machine learning models have become more and more complex and need to use larger data sets, and implementing such machine learning models therefore requires more computing resources.

Today, it is usually difficult for a computation capacity of a single machine to satisfy requirements of a large-scale machine learning model due to the restriction of computation capacity of a central processing unit (CPU) and communication bandwidth between the CPU and peripheral computing devices. Therefore, how to effectively deploy a machine learning model has already become the focus of current concerns.

SUMMARY

Embodiments of the present disclosure provide a solution for deploying a machine learning model.

According to a first aspect of the present disclosure, a method for deploying a machine learning model is provided. The method comprises: receiving an intermediate representation indicating processing of a machine learning model, learning parameters of the machine learning model, and a computing resource requirement for executing the machine learning model, the intermediate representation, the learning parameters, and the computing resource requirement being determined based on an original code of the machine learning model, the intermediate representation being irrelevant to a programming language of the original code; determining, at least based on the computing resource requirement, a computing node and a parameter storage node for executing the machine learning model; storing the learning parameters in the parameter storage node; and sending the intermediate representation to the computing node for executing the machine learning model with the stored learning parameters.

According to a second aspect of the present disclosure, an apparatus for deploying a machine learning model is provided. The apparatus comprises: at least one processing unit; at least one memory coupled to the at least one processing unit and storing instructions to be executed by the at least one processing unit. The instructions, when executed by the at least one processing unit, cause the apparatus to perform acts, the acts including: receiving an intermediate representation indicating processing of a machine learning model, learning parameters of the machine learning model, and a computing resource requirement for executing the machine learning model, the intermediate representation, the learning parameters, and the computing resource requirement being determined based on an original code of the machine learning model, the intermediate representation being irrelevant to a programming language of the original code; determining, at least based on the computing resource requirement, a computing node and a parameter storage node for executing the machine learning model; storing the learning parameters in the parameter storage node; and sending the intermediate representation to the computing node for executing the machine learning model with the stored learning parameters.

According to a third aspect of the present disclosure, a computer program product is provided. The computer program product is stored in a non-transitory computer storage medium and includes machine-executable instructions. The machine-executable instructions, upon running in an apparatus, cause the apparatus to execute any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the exemplary embodiments of the present disclosure, the same reference numerals generally denote the same components.

DETAILED DESCRIPTION

Figure 1:
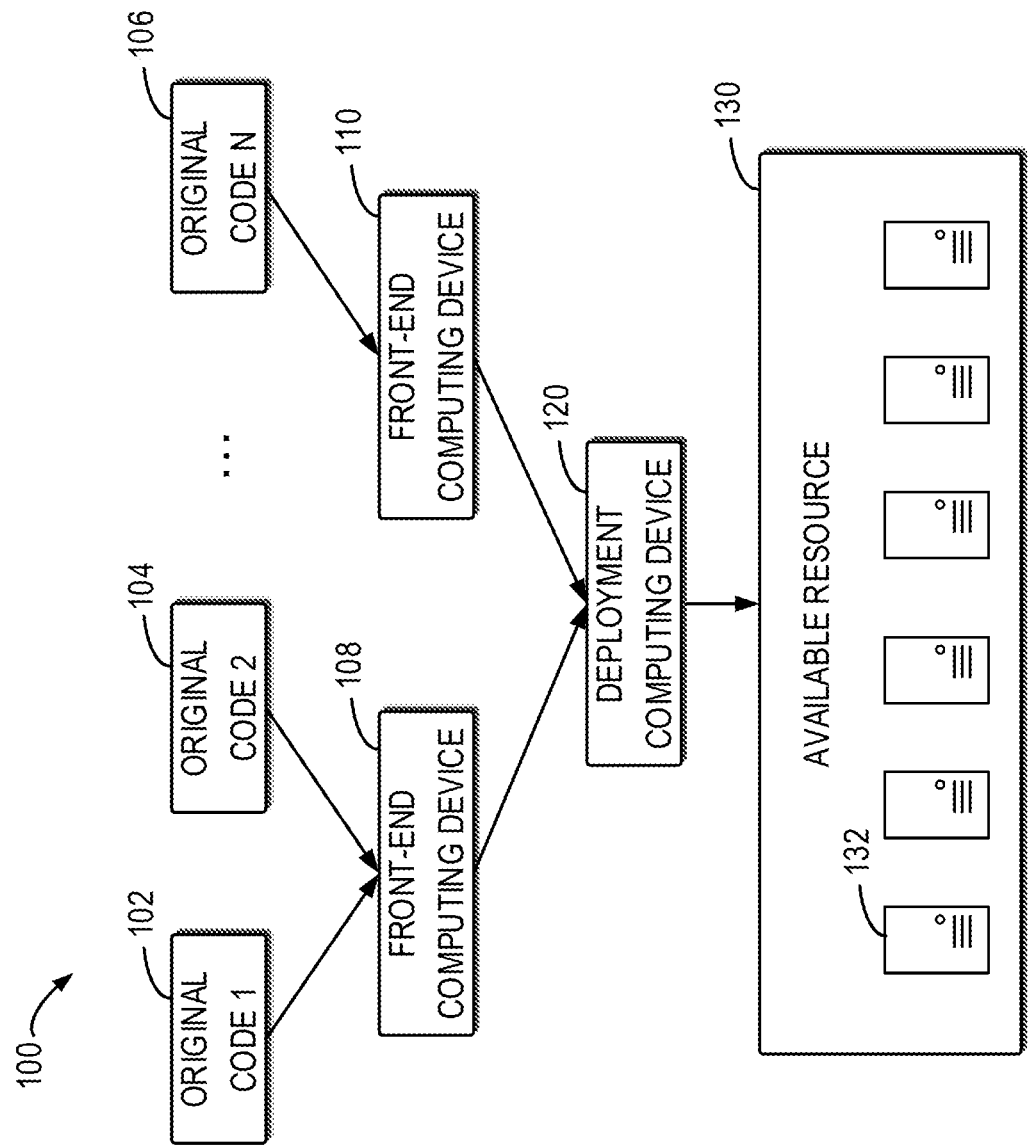
FIG. 1 illustrates an architectural diagram of a machine learning model deployment system in which embodiments of the present disclosure may be performed.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms such as "a first," "a second" and others can denote different or identical objects. The following text may also contain other explicit or implicit definitions.

As stated above, it is usually difficult for a computation capacity of a single machine to satisfy requirements of a large-scale machine learning model due to the restriction of computation capacity of a CPU and communication bandwidth between the CPU and peripheral computing devices. Therefore, a distributed and parallel machine learning framework has become the current trend.

Many public clouds today may support distributing machine learning models to many computing nodes. However, for best performance, all these clouds require not only the application/algorithm developers to have a knowledge of the low layer infrastructure of the cloud such as the Kubernetes configuration, the organization of the computing devices (CUDA or FPGA or ASIC) and the communication network, but also require the cloud maintainers and operators of the cloud to have a knowledge of the machine learning application/algorithm itself, such as what type of neural network (CNN or RNN) is to be used in this application. As a result, the daily jobs of both the application developers and the service cloud maintainers and operators are becoming quite complicated.

For example, for the traditional machine learning network deployment process, the developers need to know a number of different learning frameworks, such as TensorFlow, CNTK, MxNet, Caffe2, PyTorch, etc., and spend substantial amounts of time in learning and studying each framework. In addition, different frameworks define their own deployment primitives for different types of computing target devices (such as CUDA, OpenCL, CPU, etc.). Therefore, the deployment primitives under different frameworks are not compatible with each other.

For back-end devices that implement the machine learning network, there are many different types of computing devices, such as CPU (X86_64, NNP, Power, ARM, etc.), GPGPUs (Nvidia, AMD), FPGAs (Altera, Xilinx), and ASICs with different frameworks, and they respectively have different intermediate software development kits, such as CUDA, OpenCL, Verilog, VHDL, etc. Therefore, it is not possible to use the computing instructions of a particular device for other devices.

In addition, in the specific deployment process, the developers also need to consider: (1) different parallel mechanisms: model parallel model and data parallel model; (2) different parameter sync-up algorithms: parameter server, ring all reduce etc.; (3) different lower layer implementation of the parameter server: OpenMPI, MPICH, TCP/IP; and (4) different network communication technologies such as RDMA, GPUDirect, etc. The choosing of these technologies has greatly increased the developers' difficulty in deploying machine learning models.

According to an embodiment of the present disclosure, a solution for deploying a machine learning model is provided. In this solution, an intermediate representation indicating processing of a machine learning model, learning parameters of the machine learning model and a computing resource requirement for executing the machine learning model are received, wherein the intermediate representation, the learning parameters and the computing resource requirement are determined based on an original code of the machine learning model, and the intermediate representation is irrelevant to a programming language of the original code. Subsequently, the computing resource requirement is used to determine a computing node and a parameter storage node for executing the machine learning model. The learning parameters are then stored in the parameter storage node, and the intermediate representation is sent to the computing node to execute the machine learning model with the stored learning parameters. In this manner, the deployment system may compile machine learning models written in different languages into a unified intermediate representation and determine the computing resources for executing the machine learning model based on the computing resource requirement determined during the compilation process. Therefore, the developers for a machine learning model do not need to learn about details of devices which are to run in the background, and cloud providers/maintainers do not need to know the specific implementation of the machine learning model, which would greatly improve the efficiency of deploying machine learning models.

The basic principles and several example implementations of the present disclosure are described below with reference to the figures.

FIG. 1 illustrates an architectural diagram of a machine learning model deployment system 100 in which embodiments of the present disclosure may be performed. As shown in FIG. 1, the model deployment system 100 includes one or more front-end computing devices 108 and 110, and a deployment computing device 120. The front-end computing devices 108 and 110 may receive original codes 102, 104 and 106 of the machine learning models submitted by the user. In some embodiments, the original codes 102, 104 and 106 of the machine learning model may be codes written in different programming languages, and these programming language for example may include CUDA, Java, Python, C++, Fortran, Ada, and C #.

In some embodiments, a user (e.g., a machine learning model developer) may send the original codes 102, 104 and 106 to the front-end computing devices 108 and 110 via a personal computing device. In some embodiments, the front-end computing devices 108 and 110 may also read, from a coupled storage device, the original codes 102, 104 and 106 that need to be executed.

In some embodiments, the front-end computing devices 108 and 110 may be used to compile the original codes 102, 104 and 106 of the machine learning model into a corresponding intermediate representation. Compilation is a process of converting a source code/original code written in a programming language into a machine code or native code of a target architecture. The intermediate representation of the computer program is a version generated by a language compiler, and is irrelevant to the target execution device and the programming language of the source code. By compiling the original codes 102, 104 and 106 into an intermediate representation, the solution of the present disclosure may support machine learning models of different architectures and different languages, and these intermediate representations may be deployed on different types of computing devices, thereby improving the versatility of the model deployment system 100.

In some embodiments, the intermediate representation may include a computing graph described by a structured text and a corresponding runtime library. For example, the intermediate representation may include a computing graph of the machine learning model to be executed described in a Javascript Object Notation (JSON) or Extensible Markup Language (XML) format. The runtime library is a special computer program library that is used by the compiler to implement a programming language built-in function to provide runtime support for the language program, for example, a .so library compiled by GCC/LLVM and a CUDA kernel function library compiled by NVCC. It should be understood that compilers known in the art may be employed to generate the required computing graph and runtime library, and will not be described in detail herein. In some embodiments, the front-end computing devices 108 and 110 may send the compiled intermediate representation to a deployment computing device for deploying a corresponding machine learning model.

In some embodiments, the front-end computing devices 108 and 110 may determine, based on compilation of the original codes 102, 104 and 106, the computing resource requirement for the original codes 102, 104 and 106. In some embodiments, the computing resource requirement comprises at least one of the following: a device type for executing a machine learning model, a size of storage space required for executing the machine learning model, a network bandwidth required for executing the machine learning model, the number of threads required for executing the machine learning model and the number of computation processing unit kernels required for executing the machine learning model. For example, for the original code of a machine learning model written in CUDA, the front-end computing devices 108 and 110 may determine the size of a maximum video memory space and the number of needed threads for which the machine learning model needs to apply during the compilation.

In some embodiments, the front-end computing devices 108 and 110 may transmit the computing resource requirement determined through compilation to a deployment computing device 120 for deployment to the corresponding machine learning model.

In some embodiments, the original codes 102, 104 and 106 received by the front-end computing devices 108 and 110 may be codes associated with a well-trained machine learning model. In this case, the front-end computing devices 108 and 110 may receive the well-trained parameters of the machine learning model and send them to the deployment computing device 120 for subsequent use. In some embodiments, the user may send values of the well-trained parameters to the front-end computing devices 108 and 110 over the network, or the user may also send only a network address storing the values of the well-trained parameters to the front-end computing devices 108 and 110. In some embodiments, the front-end computing devices 108 and 110 may receive a target data set to be processed by the well-trained machine learning model or an address that stores the target data set, and forward the target data set or address to the deployment computing device 120.

In some embodiments, the original codes 102, 104 and 106 received by the front-end computing devices 108 and 110 may also be codes associated with an untrained machine learning model. In this case, the front-end computing devices 108 and 110 may randomly generate intermediate parameters of the machine learning model during compilation and send them to deployment computing device 120 for subsequent training.

In some embodiments, the front-end computing devices 108 and 110 may also receive one or more instances of additional information for executing the machine learning model, and these instances of additional information may include, but are not limited to, hyperparameter information of the machine learning model, parallel model information and resource preference information, etc.

Specifically, in some embodiments, the front-end computing devices 108 and 110 may also receive the hyperparameter information of a machine learning model designated by the user, for example, the hyperparameter may be a target learning rate and batch size of the machine learning model, and the like. In some embodiments, the user may send values of the hyperparameters to the front-end computing devices 108 and 110 over the network. Alternatively, the user may also send only a network address storing the values of the hyperparameters to the front-end computing devices 108 and 110. The front-end computing devices 108 and 110 may send the received hyperparameter information to the deployment computing device 120 for subsequent use.

In some embodiments, the front-end computing devices 108 and 110 may also receive a parallel model for executing the machine learning model designated by the user, wherein the parallel model may be one of data parallel model and model parallel model. For example, the data parallel model may mean that different computing nodes process different training data to train a target machine learning model, and the model parallel model for example may mean that different computing nodes process different layers of the machine learning model to train the target machine learning model. In some embodiments, the front-end computing devices 108 and 110 may transmit the received parallel model to the deployment computing device 120 for subsequent use.

In some embodiments, the front-end computing devices 108 and 110 may also receive a resource preference for performing the machine learning model designated by the user. In some embodiments, the resource preference may be at least one of the following: a type of a user-designated computing device for executing the machine learning model, a type of a user-designated storage device for executing the machine learning model, and a type of a user-designated communication network for executing the machine learning model, and the like. For example, a user may designate through a user interface that the machine learning model is desired to be executed using a graphics processing unit (GPU).

In some embodiments, the resource preference may also be a priority for performing the machine learning model designated by the user. For example, the user may designate that the priority of executing the machine learning model is high, medium, or low, and such priority may reflect an urgency degree to which the user desires the machine learning model to be executed. In some embodiments, when the user-designated priority is high, the machine learning model may be allocated more computing resources for completing execution at the fastest speed. When the user-designated priority is low, the machine learning model may be assigned relatively few computing resources to reduce the costs. In some embodiments, the front-end computing devices 108 and 110 may send the received resource preference to the deployment computing device 120.

As shown in FIG. 1, the deployment computing device 120 may receive, from the front-end computing devices 108 and 110, the intermediate representation indicating the processing of the machine learning model, learning parameters of the machine learning model and the computing resource requirement for executing the machine learning model. In some embodiments, the deployment computing device 120 may further receive one or more instances of additional information as stated above.

Figure 2:
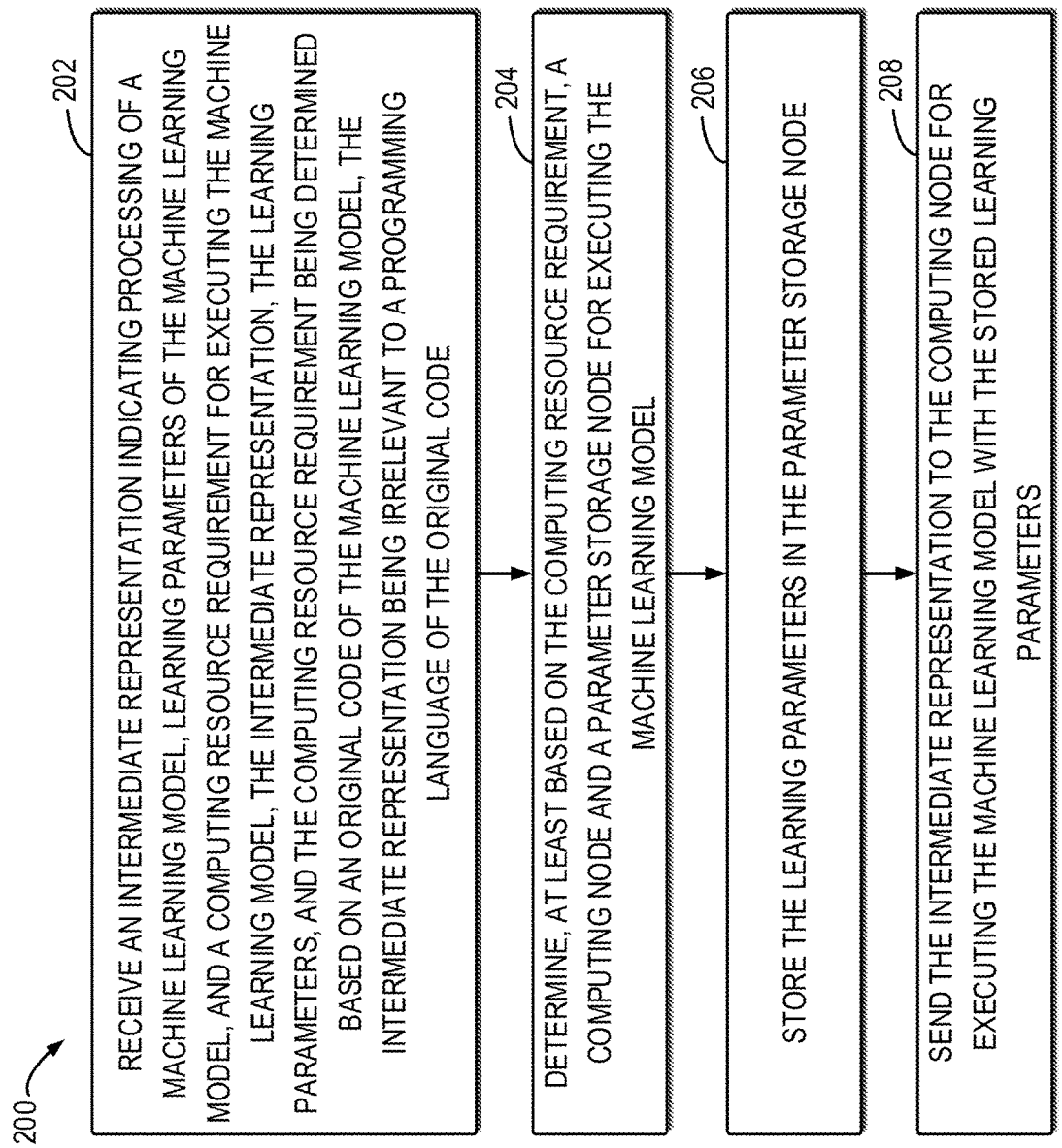
FIG. 2 illustrates a flow chart of a process of deploying a machine learning model in accordance with an embodiment of the present disclosure.
Figure 3:
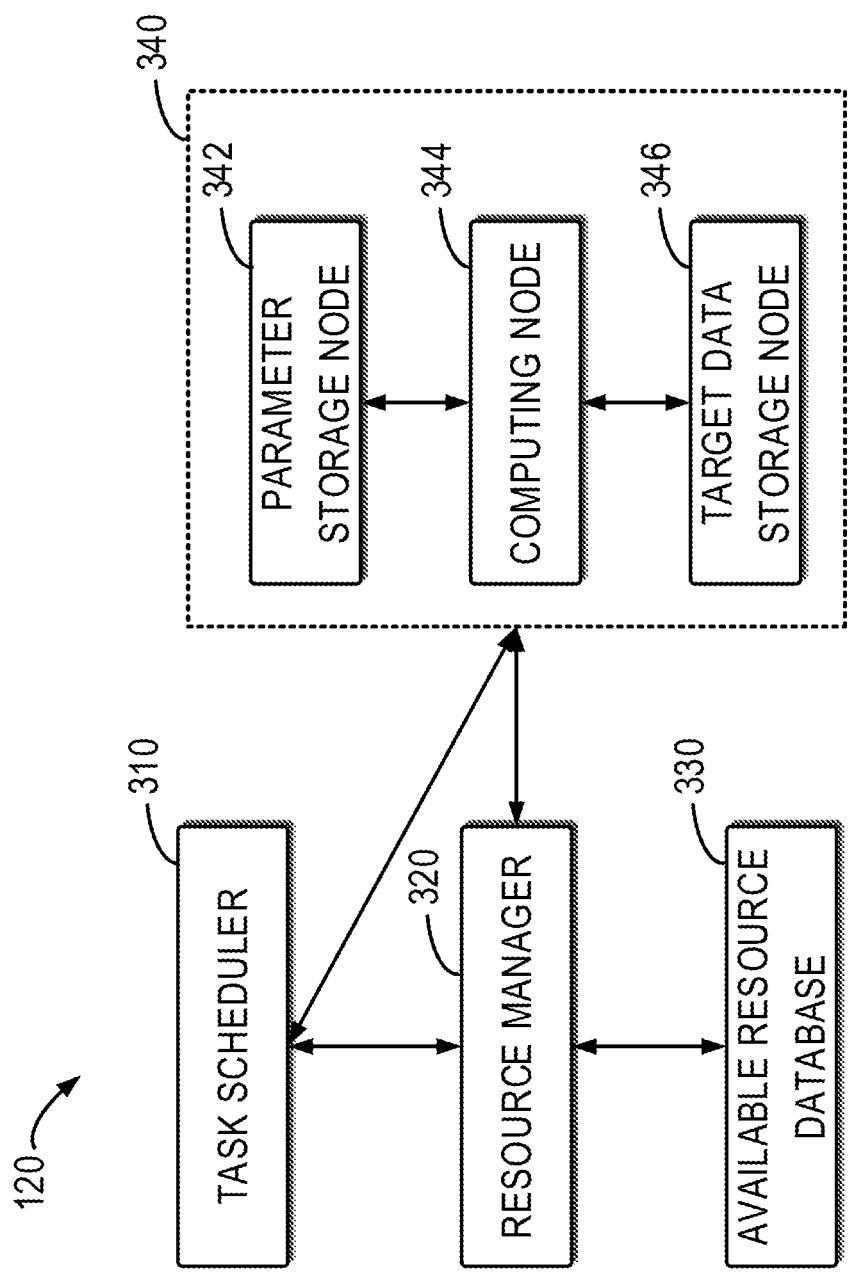
FIG. 3 illustrates a schematic diagram of a deployment computing device in accordance with an embodiment of the present disclosure.

In some embodiments, the deployment computing device 120 may deploy the machine learning model on one or more computing resources 132 in a resource pool 130 based on the information received from front-end computing devices 108 and 110. A solution of deploying a machine model in accordance with an embodiment of the present disclosure will now be described with reference to FIGS. 2 and 3. FIG. 2 illustrates a flow chart of a method 200 of deploying a machine learning model in accordance with an embodiment of the present disclosure. FIG. 3 illustrates a schematic diagram of a deployment computing device 120 in accordance with an embodiment of the present disclosure. The method 200 may be implemented by the deployment computing device 120 of FIG. 1. For ease of discussion, the method 200 will be described with reference to FIGS. 1 and 3.

At block 202, the deployment computing device 120 receives the intermediate representation indicating the processing of the machine learning model, learning parameters of the machine learning model and the computing resource requirement for executing the machine learning model, wherein the intermediate representation, the learning parameters and the computing resource requirement are determined based on an original code of the machine learning model, and the intermediate representation is irrelevant to a programming language of the original code. In some embodiments, as stated above, the deployment computing device 120 may receive the intermediate representation, learning parameters and computing resource requirement from front-end computing devices 108 and 110.

Specifically, as shown in FIG. 3, the deployment computing device 120 may include a task scheduler 310, a resource manager 320, a resource database 330 and a computing resource 340. The task scheduler 310 may receive the intermediate representation, learning parameters and computing resource requirement, and forward the computing resource requirement to the resource manager 320. In some embodiments, the task scheduler 310 may also receive one or more instances of additional information from front-end computing devices 108 and 110, and the instances of additional information may include, but are not limited to, hyperparameter information, parallel model information and resource preference information, etc. The task scheduler 310 for example may forward the received resource preference information to the resource manager 320.

Further referring to FIG. 2, at block 204, the deployment computing device 120 determines, based at least on the computing resource requirement, a computing node and a parameter storage node for executing the machine learning model. Specifically, as shown in FIG. 3, in response to receiving the computing resource requirement from the task scheduler 310, the resource manager 320 may query the resource database 330 to determine a computing node and a parameter storage node for executing the machine learning model.

In some embodiments, the resource database 330 may classify the computing resource 132 in the resource pool 130 into three categories: (a) computing nodes, each of which may be configured with a device adapted to execute the machine learning model, for example, GPU, FPGA, ASIC, etc.; (b) parameter storage nodes, each of which may be configured with a large data capacity and a high network bandwidth and used for storing training parameters or well-trained parameters; (c) target data storage nodes, each of which may be configured with an appropriate type of file system (e.g., NFS, HDFS, S3, etc.) for storing a training data set or a target data set to be processed. The resource database 330 may record the current usage of the computing resource 132 in the resource pool 130. For example, the resource database 330 may record a node type of the computing resource 132, device configuration information (e.g., whether there is a GPU, whether there is an FPGA, the number of cores of the GPU, GPU's video memory, the number of CPUs, the number of cores of the CPU, memory size, etc.), device location information (for example, a physical location of the device and a network address of the device), and usage (for example, how much video memory and how many threads have been used) and so on.

In some embodiments, the resource manager 320 may query the resource database 330 for a database entry that meets the received computing resource requirement, and then determine the computing resource 132 corresponding to the entry. For example, when the received computing resource requirement is a "GPU" with a maximum video memory size "300 MB" and 200 threads, the resource manager 320 queries the resource database to determine if there is an entry that satisfies the resource requirement. If a corresponding entry is found, the resource manager 320 may obtain information of the computing resource 132 corresponding to the entry. If the corresponding entry is not found, the resource manager 320 may send a message to the task scheduler 310 indicating that execution of the machine learning model is suspended to wait for the corresponding computing resource.

In some embodiments, the task scheduler 310 may also receive the resource preference from the front-end computing devices 108 and 110 and forward the resource preference to the resource manager 320. In some embodiments, the resource manager 320 may determine, based on both the resource preference and the resource requirement, a computing node and a parameter storage node for executing the machine learning model.

For example, when the resource preference indicates that the execution priority is high, the resource manager 320 may adjust the computing node and/or parameter storage node determined based on the resource requirement, for example, by allocating more and/or better-performing computing nodes/parameter storage nodes, so that execution of the machine learning model can be completed quickly. For example, when the resource preference indicates that the user designates to use a GPU with a low performance to execute the machine learning model to reduce cost, the resource manager 320 may first filter the resource database 330 for a set of entries of the less-performing GPU, and select a computing node and/or a parameter storage node for execution from the set of entries. In this manner, the deployment computing device 120 may consider the user's personalized needs while ensuring that the computing resource requirement can be met.

Based on the above manner, the resource manager 320 may automatically determine a computing resource 340 for executing the machine learning model, the computing resource 340 including a parameter storage node 342, a computing node 344 and a target data storage node 346, so that none of the front-end developers and back-end maintenance personnel need to pay attention to specific details.

At block 206, the deployment computing device 120 stores the learning parameters in the parameter storage node. In some embodiments, as shown in FIG. 3, after the resource manager 320 determines the parameter storage node 342, the computing node 344 and the target data storage node 346 for executing the machine learning model, the resource manager 320 may send identification information (e.g., network address) of the parameter storage node 342, the computing node 344 and the target data storage node 346 to the task scheduler 310. The task scheduler 310 may send the received learning parameters (either trained or untrained parameters) to the parameter storage node 342 for subsequent use based on the identification information of the parameter storage node 342.

In some embodiments, based on the identification information of the target data storage node 346, the task scheduler 310 may store the received target data (training data or target data to be processed) in the target data storage node 346.

At block 208, the deployment computing device 120 sends the intermediate representation to the computing node for executing the machine learning model with the stored learning parameters. In some embodiments, as shown in FIG. 3, based on the identification information of the computing node 344, the task scheduler 310 may send the received intermediate representation to the computing node 344 to execute the machine learning model.

Specifically, in some embodiments, in a case that the computing node 344 is to train the machine learning model, the computing node 344 may read corresponding training data from the target data storage node 346 and use the corresponding training parameters in the parameter storage node 342 to perform iterative training for the machine learning model and update the training parameters stored in the parameter storage node 342 after each iteration until the training of the machine learning model is completed.

In some embodiments, the task scheduler 310 may receive information of user-designated parallel model from the front-end computing devices 108 and 110. In response to receiving the information of the parallel model, the task scheduler 310 may notify the computing node 344 of the designated parallel model such that the computing node 344 may execute the machine learning model in accordance with the designated parallel model. For example, in a case that the designated parallel model is data parallel model, the computing node 344 may only read a portion of the data in the target data storage node 346 and update the corresponding parameters in the parameter storage node 342 after each iteration. If the designated parallel model is a model parallel model, the computing node 344 may read the corresponding data in the target data storage node 346, and only the corresponding computing node 343 performs a parameter update.

In some embodiments, in response to not receiving information regarding the parallel model, the task scheduler 310 may determine the parallel model to be used, based on the intermediate representation. For example, for a task with large training data, the data parallel model may be used for execution. It should be understood that a parallel model determining technique well known in the art may be employed to select a suitable parallel model technique, which will not be described in detail herein.

In some embodiments, the task scheduler 310 may also receive the user-designated hyperparameter information from the front-end computing devices 108 and 110. In response to receiving the hyperparameter information, the task scheduler 310 may send the hyperparameter information to the computing node 344, causing the computing node 344 to execute the machine learning model in accordance with the hyperparameter information. For example, the computing node 344 may perform training of the machine learning model based on a training rate designated by the user.

In some embodiments, when the computing node 344 is to process the target data using the well-trained machine learning model, the computing node 344 may read the corresponding target data from the target data storage node 346 as input of the machine learning model, and execute the machine learning model with the trained parameters stored in parameter storage node 342 to obtain an output corresponding to the input.

Through the above method, the technical solution of the present disclosure may automatically convert the source code of the machine learning model of different languages and different frameworks into a unified intermediate representation by a compiler, and automatically determine, based on the computing resource requirement determined during the compilation process, the computing resource for executing the machine learning model from the back-end resource pool, and finally deploy the model on the computing resource for execution. Therefore, such a solution may greatly reduce the complexity of deploying the machine learning model, thereby reducing the workload of front-end developers and back-end maintenance persons.

Figure 4:
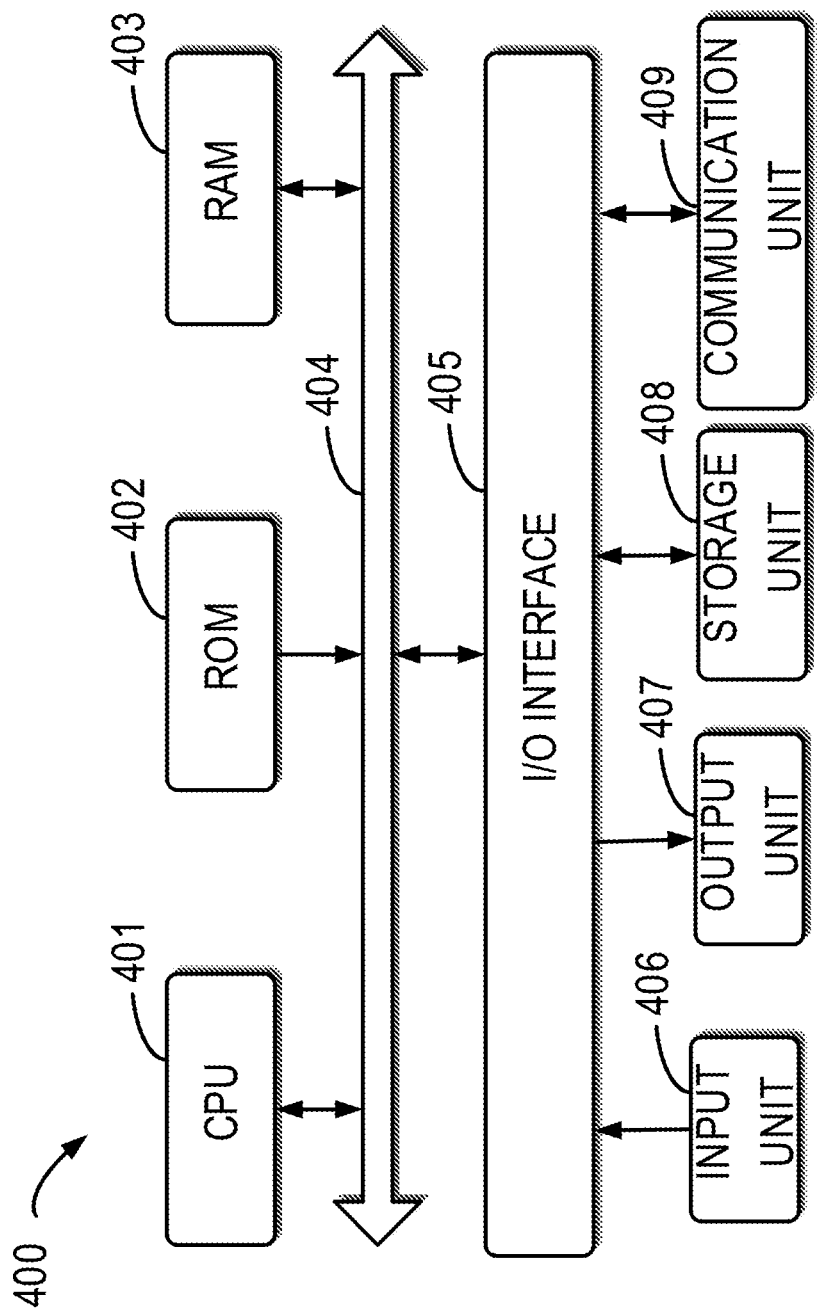
FIG. 4 illustrates a schematic block diagram of an example device that may be used to implement embodiments of the present disclosure.

FIG. 4 shows a schematic block diagram of an example device 400 that can be used to implement embodiments of the present disclosure. For example, the front-end computing device 108 and/or 110 and the deployment computing device 120 as shown in FIG. 1 can be implemented by device 400. As shown, device 400 includes a central processing unit (CPU) 401 that can perform various appropriate actions according to computer program instructions stored in read only memory (ROM) 402 or loaded from storage unit 408 into a random access memory (RAM) 403. In the RAM 403, various programs and data required for the operation of the device 400 can also be stored. The CPU 401, the ROM 402, and the RAM 403 are connected to each other through a bus 404. An input/output (I/O) interface 405 is also coupled to bus 404.

A plurality of components in device 400 are coupled to I/O interface 405, including: input unit 406, such as a keyboard, mouse, etc.; output unit 407, such as various types of displays, speakers, etc.; storage unit 408, such as a disk and an optical unit, etc.; and a communication unit 409 such as a network card, a modem, a wireless communication transceiver, and the like. Communication unit 409 allows device 400 to exchange information/data with other devices over a computer network such as the Internet and/or various telecommunication networks.

The various processes and processes described above, such as method 200, may be performed by CPU 401. For example, in some embodiments, method 200 can be implemented as a computer software program that is tangibly embodied in a machine readable medium, such as storage unit 408. In some embodiments, some or the entire computer program may be loaded and/or installed onto device 400 via ROM 402 and/or communication unit 409. One or more actions of method 200 described above may be performed when a computer program is loaded into RAM 403 and executed by CPU 401.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but is not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, RAM, ROM, erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfer media, wireless transfer media, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, and to enable those of ordinary skill in the art to understand the embodiments in the disclosure.

What is claimed is:

1. A method of deploying a machine learning model, comprising:

receiving a unified intermediate representation indicating processing of a machine learning model, learning parameters of the machine learning model, and a computing resource requirement for executing the machine learning model, the unified intermediate representation, the learning parameters, and the computing resource requirement being determined based on an original code of the machine learning model, the unified intermediate representation being a compilation of original code written in different programming languages of a plurality of machine learning models, the compilation of the original code being independent of the different programming languages;

determining, at least based on the computing resource requirement, a computing node and a parameter storage node for executing the machine learning model;

storing the learning parameters in the parameter storage node; and sending the unified intermediate representation to the computing node for executing the machine learning model with the stored learning parameters.

2. The method according to claim 1, wherein the computing resource requirement comprises at least one of the following:

a type of a device for executing the machine learning model, a size of a storage space required for executing the machine learning model, the number of threads required for executing the machine learning model, a network bandwidth required for executing the machine learning model, and the number of computation processing unit kernels required for executing the machine learning model; and wherein the computing resource requirement is determined based on compiling of the original code.

3. The method according to claim 1, wherein the learning parameters are trained machine learning model parameters.

4. The method according to claim 1, wherein the learning parameters are obtained by randomly generating intermediate parameters during compiling of the original code, and training the intermediate parameters.

5. The method according to claim 1, further comprising:
receiving training data for training the machine learning model; and
loading the training data into a training data storage node.

6. The method according to claim 1, wherein the unified intermediate representation comprises a computing graph and a corresponding runtime library, the computing graph being described by a structured text.

7. The method according to claim 1, further comprising:
receiving a parallel mode for executing the machine learning model, the parallel mode being one of a data parallel mode and a model parallel mode; and
causing the computing node to execute the machine learning model in the parallel mode.

8. A device for deploying a machine learning model, comprising:
at least one processing unit; and
at least one memory coupled to the at least one processing unit and storing instructions for execution by the at least one processing unit, the instructions, when executed by the at least one processing unit, causing the device to perform acts comprising:
receiving a unified intermediate representation indicating processing of a machine learning model, learning parameters of the machine learning model, and a computing resource requirement for executing the machine learning model, the unified intermediate representation, the learning parameters, and the computing resource requirement being determined based on an original code of the machine learning model, the unified intermediate representation being a compilation of original code written in different programming languages of a plurality of machine learning models, the compilation of the original code being independent of the different programming languages;

determining, at least based on the computing resource requirement, a computing node and a parameter storage node for executing the machine learning model;

storing the learning parameters in the parameter storage node; and sending the unified intermediate representation to the computing node for executing the machine learning model with the stored learning parameters.

9. The device according to claim 8, wherein the computing resource requirement comprises at least one of the following:

a type of a device for executing the machine learning model, a size of a storage space required for executing the machine learning model, the number of threads required for executing the machine learning model, a network bandwidth required for executing the machine learning model, and the number of computation processing unit kernels required for executing the machine learning model; and wherein the computing resource requirement is determined based on compiling of the original code.

10. The device according to claim 8, wherein the learning parameters are trained machine learning model parameters.

11. The device according to claim 8 wherein the learning parameters are obtained by randomly generating intermediate parameters during compiling of the original code, and training the intermediate parameters.

12. The device according to claim 8, the acts further comprising:
receiving training data for training the machine learning model; and
loading the training data into a training data storage node.

13. The device according to claim 8, wherein the unified intermediate representation comprises a computing graph and a corresponding runtime library, the computing graph being described by a structured text.

14. The device according to claim 8, wherein the acts further comprise:
receiving a parallel mode for executing the machine learning model, the parallel mode being one of a data parallel mode and a model parallel mode; and
causing the computing node to execute the machine learning model in the parallel mode.

15. A computer program product being stored in a non-transitory computer storage medium and comprising machine-executable instructions which, when executed by a device, cause the device to perform a method of deploying a machine learning model, the method comprising:
receiving a unified intermediate representation indicating processing of a machine learning model, learning parameters of the machine learning model, and a computing resource requirement for executing the machine learning model, the unified intermediate representation, the learning parameters, and the computing resource requirement being determined based on an original code of the machine learning model, the unified intermediate representation being a compilation of original code written in different programming languages of a plurality of machine learning models, the compilation of the original code being independent of the different programming languages;

determining, at least based on the computing resource requirement, a computing node and a parameter storage node for executing the machine learning model;

storing the learning parameters in the parameter storage node; and sending the unified intermediate representation to the computing node for executing the machine learning model with the stored learning parameters.

16. The computer program product according to claim 15, wherein the computing resource requirement comprises at least one of the following:

a type of a device for executing the machine learning model, a size of a storage space required for executing the machine learning model, the number of threads required for executing the machine learning model, a network bandwidth required for executing the machine learning model, and the number of computation processing unit kernels required for executing the machine learning model; and wherein the computing resource requirement is determined based on compiling of the original code.

17. The computer program product according to claim 15, wherein the learning parameters comprise at least one of (i) trained machine learning model parameters and (ii) learning parameters obtained by randomly generating intermediate parameters during compiling of the original code, and training the intermediate parameters.

18. The computer program product according to claim 15, wherein the method further comprises:

receiving training data for training the machine learning model; and loading the training data into a training data storage node.

19. The computer program product according to claim 15, wherein the unified intermediate representation comprises a computing graph and a corresponding runtime library, the computing graph being described by a structured text.

20. The computer program product according to claim 15, wherein the method further comprises:

receiving a parallel mode for executing the machine learning model, the parallel mode being one of a data parallel mode and a model parallel mode; and causing the computing node to execute the machine learning model in the parallel mode.

* * * * *